Dec. 8, 1964  R. P. LAPSLEY  3,160,702
ALTERNATING CURRENT PIPE CABLE SYSTEM WITH MAGNETIC FIELD TRAP
Filed Sept. 22, 1961  3 Sheets-Sheet 1

INVENTOR.
BY

Dec. 8, 1964   R. P. LAPSLEY   3,160,702
ALTERNATING CURRENT PIPE CABLE SYSTEM WITH MAGNETIC FIELD TRAP
Filed Sept. 22, 1961   3 Sheets-Sheet 2

Rhea P. Lapsley
INVENTOR.
BY

Dec. 8, 1964    R. P. LAPSLEY    3,160,702
ALTERNATING CURRENT PIPE CABLE SYSTEM WITH MAGNETIC FIELD TRAP
Filed Sept. 22, 1961    3 Sheets-Sheet 3

3,160,702
ALTERNATING CURRENT PIPE CABLE SYSTEM
WITH MAGNETIC FIELD TRAP
Rhea P. Lapsley, Ridgewood, N.J., assignor to The
Okonite Company, Passaic, N.J., a corporation of New
Jersey
Filed Sept. 22, 1961, Ser. No. 139,918
5 Claims. (Cl. 174—32)

This invention is directed to an improvement in multi-conductor, alternating-current electric power cable systems of the metallic-pipe encased type, such as are used, for example, in large underground high-voltage cable transmission circuits.

In conventional pipe-type cable systems, the several insulated conductors are drawn into a single pipe to form the cable system. The conductors are normally insulated with oil-impregnated paper. The pipe containing the insulated cable is evacuated and filled with a fluid such as oil or gas, and pressure is maintained on the fluid, which increases the dielectric strength of the insulation. The pipe must therefore be pressure tight. Inasmuch as impregnated paper insulation is adversely affected by even minute amounts of moisture, the insulated cable enclosure must also be absolutely vapor tight over many years of operation.

These requirements, as well as the requirements for ease of jointing between lengths of the enclosure, mechanical ruggedness, as well as some operating advantages and safety considerations, dictate the use of metallic pipes rather than non-metallic pipes for the enclosures, although electrical energy losses in the cable system are substantially increased by the presence of metallic pipe, especially in cable systems of large conductor size, for example 1500 MCM and larger.

The additional electrical losses, in a cable system having conventional conductors encased in a conventional metallic pipe enclosure, above and beyond the losses which would exist with a non-metallic enclosure, can be considered as developing from two principal causes: (1) hysteresis and/or circulating current losses induced within the wall of the metallic pipe, and (2) additional losses within each conductor due to increased induced currents circulating within each conductor among the strands of said conductor.

It is a primary object of the invention to eliminate a substantial portion of the losses due to both of these causes.

In the accompanying drawings.

While the drawings and description are directed to a three-phase power cable system, this is done for the sake of simplicity and not by way of limitation, inasmuch as it is to be understood that the invention is also applicable to other alternating-current power cable systems.

Figure 1:
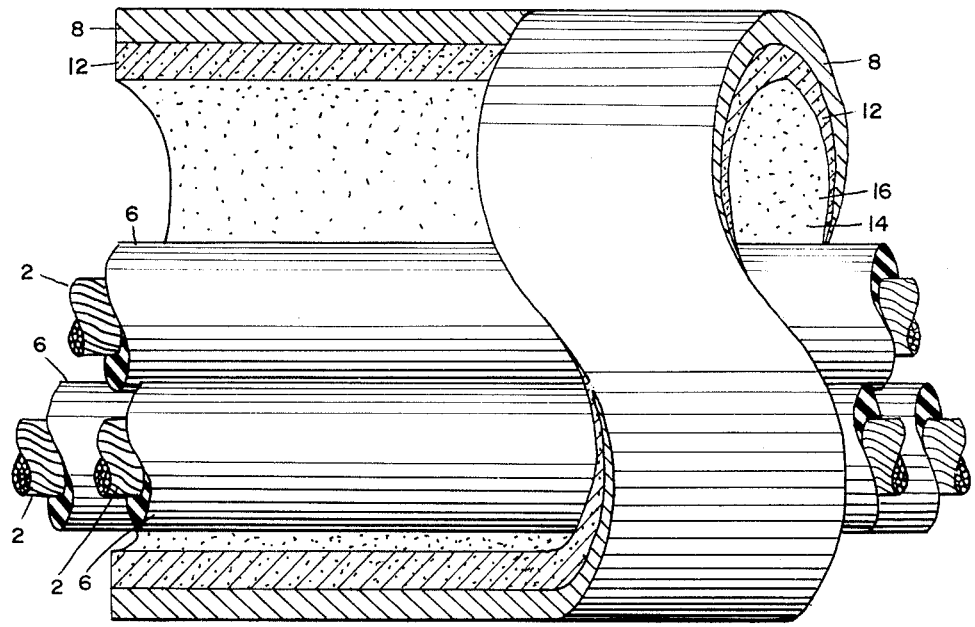
FIG. 1 is a part-sectional elevation view of one embodiment of the invention.
Figure 2:
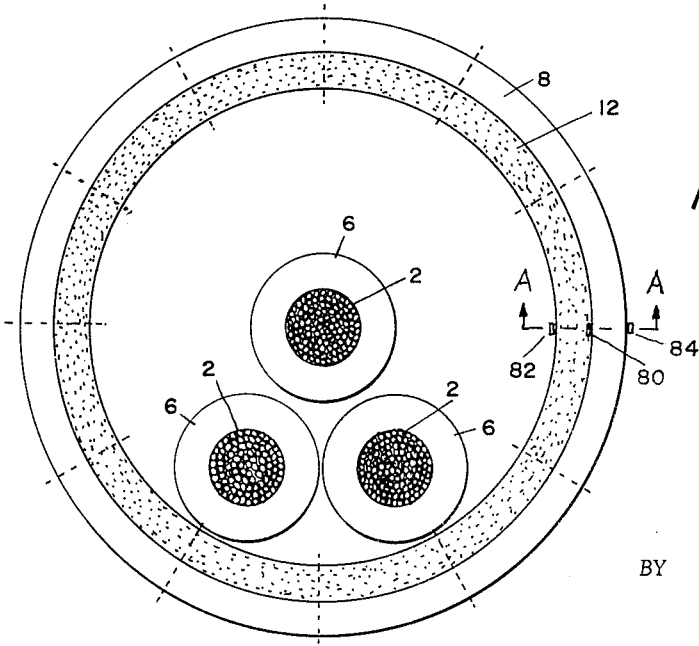
FIG. 2 is an end view of FIG. 1.

Referring in detail to the drawings and, first of all, to FIGS. 1 and 2, a plurality of stranded, insulated conductors 2 is encased in a metallic enclosure 8, such as a metallic pipe, which is rugged, pressure-retaining, and provides a barrier against the entry of moisture. Each of the conductors 2 is insulated with conventional insulation 6, which may be shielded if desired. This insulation provides requisite dielectric strength from conductor to conductor and from conductor to the shield and/or to the pipe 8 when each of the separate conductors is energized at different polarities from a three-phase alternating-current power source.

The metallic enclosure or pipe 8 is lined to provide a magnetic field trap 12 intermediate the conductors and the pipe. This magnetic field trap is composed in whole or in part of a material having high magnetic permeability, lower or negligible hysteresis loss, and inherently high electrical resistance or it is so fabricated as to provide high electrical resistance. For example, the pipe lining or magnetic field trap may comprise finely divided, hydrogen-annealed iron powder dispersed in a matrix material, such as an epoxy for instance, which will harden after application. The mixture of magnetic material 14 and matrix material 16 may be spray-coated on the interior of the pipe or applied by spreading with a mandrel or other well-known means. The iron powder inherently has high contact resistance from particle to particle, and, in addition, the matrix 16 in which it is dispersed has some insulating quality and encapsulates the particles, thereby providing electrical resistance between particles.

In operation of the cable system on a three-phase alternating-current circuit, when current flows through the conductors, a two-pole rotating magnetic field extending the full length of the raceway is created. The strength of this rotating magnetic field increases as the amperes of current in the conductors are increased.

In conventional systems, this rotating magnetic field extends between and cross the conductors and enters the metallic pipe wall, inducing longitudinal voltages which produce longitudinal currents in the pipe walls as the revolving field cuts portions of the stationary pipe wall. This current flows in opposite directions at the north and south poles of the revolving magnetic field. If the pipe is of steel, the penetration of the field and induction of the current are confined to the inner skin of the pipe wall while with metals such as aluminum or copper the field penetrates deeper. The loss resulting from the circulating current in the pipe wall is applicable in either case when heavy current flows in the conductors. Steel pipes also have hysteresis losses which are appreciable.

The instant invention departs from this practice in that the magnetic field trap 12 is interposed intermediate the pipe wall and the conductors. In operation, the magnetic field generated by the conductors extends across the interior of the pipe and enters the field trap 12 rather than the pipe wall. As the trap is comprised of material 14 of high magnetic permeability the magnetic lines of force upon contacting and entering the trap extend circumferentially within the field trap from one pole to the other to close the magnetic circuit. Thus lines of force of the revolving magnetic field cut and are primarily confined to the magnetic field trap rather than cutting the pipe wall as the two-pole magnetic field revolves.

As explained previously, the magnetic particles 14 of the magnetic field trap 12 have a high inherent electrical resistance. For example, it has been found that hydrogen-annealed pure iron powder exhibits a very high electrical resistance even when the powder particles are packed tightly together. This unexpected phenomenon is undoubtedly due to the multiplicity of microscopically thin air gaps in series between the various particles. The matrix material 16, when used to hold the magnetic material 14 in place, will add to the inherent electrical resistance of the particles of the magnetic material or of the contact resistance between said particles or of the space between said particles. Any one of these influences alone is sufficient to resist the small longitudinal voltages above referred to and positively prevents longitudinal flow of current along the length of the cable system within the cross-section of the field trap.

The magnetic field trap may be applied to the metallic enclosure with a sufficient thickness and adequate volumetric loading of magnetic material in the matrix to give sufficient magnetic permeability essentially to trap and hold all of the magnetic field within the area bounded by and enclosed within the magnetic trap, plus the area of the thickness of the magnetic field trap, before complete magnetic saturation of the magnetic material of the trap and thus prevent any substantial magnetic field from entering the walls of the metallic enclosure or pipe 8 at the maximum conductor current loads for which the cable system is designed. At heavy overloads some small magnetic field may penetrate the pipe wall, but, inasmuch as the field trap prevents a substantial portion of the field from reaching the metallic enclosure, only negligible currents will be induced in the enclosure even under heavy overloads.

The magnetic material of the field trap may be magnetically soft. The metal pipes conventionally employed are carbon steel and relatively magnetically hard, requiring a relatively high magnetizing force to cause penetration of the pipe wall. This difference in magnetic properties between the magnetic field trap 12 and the pipe 8 decreases the angle of incidence of the magnetic flux lines with the pipe wall and, therefore, reduces penetration of the pipe wall by the flux, thus permitting the use of thin magnetic field traps. For example, hydrogen-annealed iron powder mixed with epoxy resin and a catalyst to a consistency which can be pressure-sprayed or smeared on the pipe interior to a thickness of approximately one-eight inch produces a substantial reduction in losses occurring within the pipe wall from circulating currents and from hysteresis in cable systems with conductors as large as 1500 MCM of conventional segmental construction.

The magnetizing force required for saturation of the specific ferro-magnetic powder employed, when dispersed in the matrix, will depend upon the closeness of packing the ferro-magnetic particles together. For example, magnetic particles widely dispersed in a relatively thick field trap will require a higher magnetizing force or current in the conductors to cause saturation of the particles than the same number of magnetic particles packed closer together and contained in a relatively thin field trap. This is because of the fringing effect between loosely packed particles. However, fringing increases the amount of flux entering the pipe wall. It will be seen, therefore, that economics will determine the relative loading of magnetic particles into the matrix and the thickness of application of the magnetic-trap coating to the interior of the metallic enclosure or pipe.

The relative effectiveness of the magnetic-trap coatings is determined by comparative tests on a plurality of short-length samples of pipe internally coated with a range of volumetric loadings of various powdered magnetic materials in the matrix and applied with the same thickness, and with one combination of powdered material and matrix applied with different thicknesses in the different samples to give a range of thickness. The pipe samples are individually energized by placing within each pipe three lengths of insulated cable connected together with a Y connection at one end and energized from a three-phase variable current source provided with an ammeter at the other end.

Figure 9:
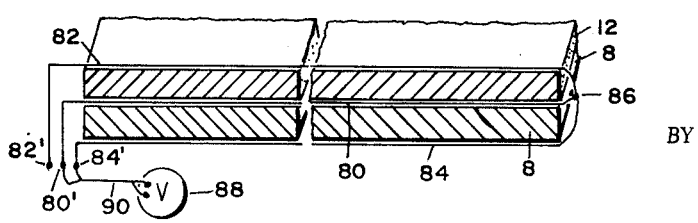
FIG. 9 is a part section, part schematic showing of a test apparatus.

Along with application of the magnetic trap to each test length of pipe, each length is provided with a plurality of test loops, each extending longitudinally of the pipe for the full length of the pipe. These loops may be formed of narrow strips of very thin conducting metallic foil, insulated on its surface with a thin coating of enamel. A strip of said insulated foil is cemented to the interior surface of the pipe at angular intervals circumferentially of the pipe, for example, at 30 degree intervals, as indicated by dotted lines in FIG. 2, prior to application of the magnetic field trap. Each of these strips 80 therefore lies along the interface of pipe 8 and magnetic field trap 12 as shown in FIG. 9. After application of the magnetic field trap, a strip 82 is cemented to the interior surface of the magnetic field trap 12 directly over each strip 80, and a strip 84 is cemented to the exterior surface of the pipe 8 directly under each strip 80, as shown in part section view FIG. 9, for one set of loops indicated in end view in FIG. 2. Referring to FIG. 9, one of the ends of each strip in each individual set of strips 80, 82, and 84 are electrically connected together by Y joint 86. The opposite ends of each individual set of strips 80, 82 and 84 are brought into close relation with each other, to prevent extraneous pickup, but left open circuited as shown at terminals 80', 82' and 84', thus providing a set of single turn loops. The open circuited loop composed of terminal 82', strip 82, joint 86, strip 80, and terminal 80' therefore encloses any magnetic lines of force in the cross-section portion of the magnetic field trap 12 enclosed by the loop. The open circuited loop composed of terminal 80', strip 80, joint 86, strip 84, and terminal 84' therefore encloses any magnetic lines of force in the cross-section portions of the wall of pipe 8 enclosed by the loop. Likewise the open circuited loop composed of terminal 82', strip 82, joint 86, strip 84, and terminal 84' encloses any magnetic lines of force in the cross-section portions of the magnetic field trap 12 and wall of pipe 8 enclosed by the loop. As indicated in FIG. 2, a plurality of sets of loops at intervals around the pipe wall are provided.

A high-impedance voltmeter 88 is connected by two conductor lead 90 across the terminals 80'-84', and 80'-82', and 82'-84', successively to measure the voltage induced in the various test loops under various current loadings as shown by the ammeter on the current source. Similar tests are made in the loops at the various angular intervals. When the test setup is energized at small current, the highly permeable magnetic field trap confines the magnetic flux lines primarily to the field trap and prevents unlimited expansion of the revolving magnetic field generated by the current in the conductors, and this magnetic field will therefore not appreciably penetrate into the pipe wall. Therefore voltage will be induced primarily in loop 80-82 enclosing the field trap and be detectable on the voltmeter when connected to terminals 80'-82'. As little if any flux reaches the pipe wall, the voltmeter will show negligible voltage when connected to loops 80-84 enclosing the pipe wall. The voltage shown by connection of the voltmeter to loop 82-84 is the vector sum of the voltage of the other loops.

As current in the conductors is infinitely increased, the magnetic flux will increase, the fringing effect will increase, and finally the magnetic mataerial of the magnetic field trap will become saturated. At some stage of this current increase the revolving magnetic field will penetrate to a significant extent into the pipe wall. Significant voltage is then detectable by the voltmeter in the test loops 80–84 enclosing the pipe wall, indicating circulating current loss is beginning to occur in the pipe wall. This test, therefore, provides a relative, comparative test for the effectiveness of various combinations of magnetic materials at various concentrations within the matrix when applied in various thicknesses on the pipe interior for various sizes and constructions of insulated conductors at various current loads.

Alternative to a single turn, each of the loops may comprise a plurality of turns of conducting foil, which will increase the voltage detectable and decrease relative effect of extraneous pickup in the leads.

Alternative to using a voltmeter, each voltage induced in the loops may be displayed separately on an oscilloscope, or displayed simultaneously on an oscilloscope used in conjunction with a multi-channel electronic switching device.

It is, therefore, apparent that this invention has provided an economical magnetic field trap which will substantially reduce the energy loss occurring in the pipe wall of pipe-type cables, the trap preventing heavy magnetic fields from entering the pipe wall and causing appreciable circulating current and hysteresis losses therein.

It is apparent also that this invention has provided a test method and apparatus for testing the relative effectiveness of the magnetic field trap in preventing the magnetic field from reaching the pipe.

While the magnetic field trap substantially reduces the loss occurring in the pipe, in so doing, the magnetic field is confined or squeezed into a smaller space, so that the intensity of the magnetic field extending across the pipe interior is increased, and a greater number of lines of force is concentrated within the cross-section of each conductor as well as between the conductors than would be the case without the magnetic field trap. The magnetomotive force of the field is therefore increased due to the higher voltage required to force a given current through the conductors. The internal reactance of the conductors is also increased. When conventional conductors are employed within the pipe, their increase in internal reactance causes the current to divide among the conductor strands to produce more non-uniformity of phase angles of the various strand currents within each conductor, and changes the GMD of the conductor, and changes strand IR and IX drops occurring within each conductor in an effort to reduce the internal reactance of the conductor thereby to reduce the effective impedance of the current path through the conductor. The induced currents circulating along some strands of the conductor and back in other ergy loss occurring within the cable system. This is done tors cause more I²R loss within the conventional conductors of the cable systems. Therefore, the use of the magnetic field trap in cable systems employing conventional conductors, while considerably reducing the loss occurring in the pipe, slightly increases the energy loss occurring in the conductors.

The design is optimized by testing for the total energy loss occurring within the scale system. This is done on samples of 30 to 40 feet of the cable system by well-known tests wherein the conductors are connected in Y at one end and to a three-phase power supply at the other. Wattmeters measure the total energy supplied to the cable system for various currents. The optimum combination of conductor size, pipe size, and field trap construction for a maximum transmission efficiency at a given current load may be found by testing a range of various combinations and plotting and comparing the test results.

While the magnetic field trap is a step forward in cable systems employing conventional conductors up to a certain size and operated up to a certain frequency, the benefits of the field trap are offset by increased loss in the conductors when the conductors are increased to large sizes and/or the current frequency is increased; consequently, when a cable system involves large-size conductors or when current frequency is increased, dynamically balanced conductors are employed to maintain low conductor loss. These conductors may be of the spacer type, as disclosed in Lapsley Patent 2,972,658, dated February 21, 1961; copending Lapsley applications Serial No. 89,774, filed February 16, 1961, and Serial No. 90,398, filed February 20, 1961, now abandoned; and copending application of Lapsley and Brown, Serial No. 27,443, filed May 6, 1960; or conductors of the transposed strand type, as disclosed in Lapsley copending application Serial No. 23,681, filed April 21, 1960, as well as in Lapsley copending application Serial No. 90,398 above referred to. Any of the spacer-type, dynamically balanced conductors above referred to may be equipped with magnetic spacers, such as disclosed by Lapsley copending application Serial No. 108,875, filed May 9, 1961. These conductors may be designed to eliminate induced current circulating among strands of the conductor even when used in a pipe equipped with a magnetic field trap, so substantial increase of conductor loss is avoided.

Figure 3:
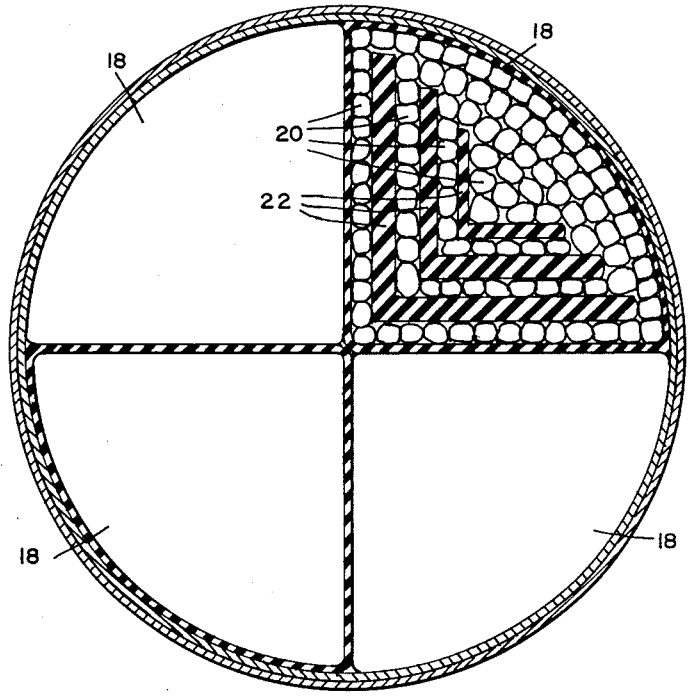
FIGS. 3–7 show various constructions of dynamically balanced conductors for use in the metallic enclosure shown in FIG. 1.

A conductor of the dynamically balanced spacer type, such as disclosed in the Lapsley issued patent above referred to is shown in FIG. 3 of the accompanying drawings. As will be seen from the drawing, such a conductor comprises a plurality of spiraled sector-shaped segments 18, each segment comprising nested layers 20 of spiraled film-coated strands. Spacers 22 are provided intermediate the strand layers. These spacers extend longitudinally of the segment along the apex of the layers and radiate from the apex of the layers along the flat faces of the layers, to separate the nested layers of strands along the sides in closest proximity to the conductor center. Along the arcuate perimeter face, viz., the face in closest proximity to the conductor perimeter, each nested layer of strands lies close to the adjacent layer. The spacers 22 may be composed of paper, nylon, or plastic, for example; or they may have a magnetic permeability greater than air, such as disclosed in the Lapsley copending application Serial No. 108,875 above referred to.

Figure 4:
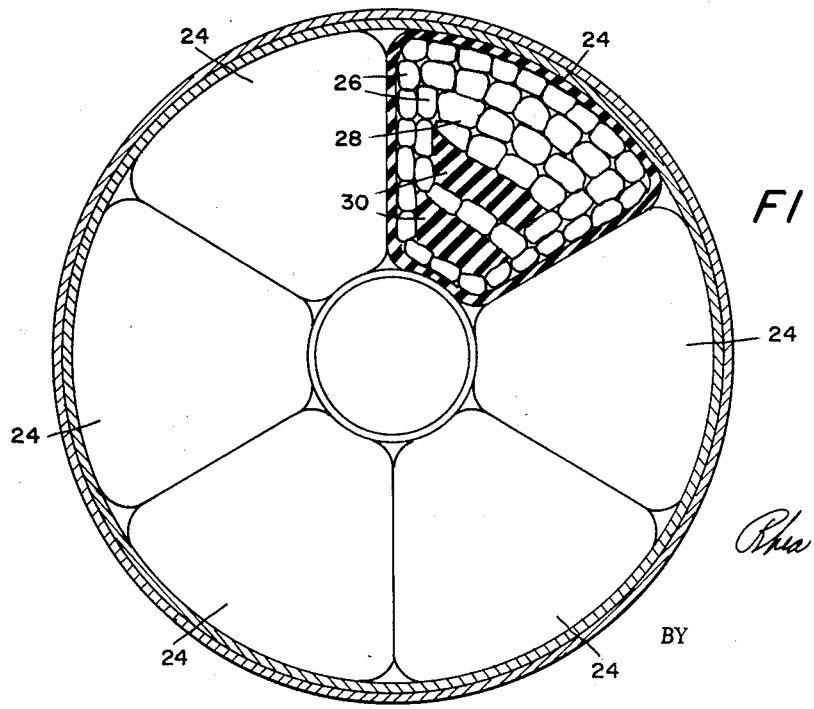

A conductor of the dynamically balance spacer type, such as disclosed in the Lapsley copending application Serial No. 89,774 above referred to, is shown in FIG. 4. Such a conductor comprises a plurality of spirally laid voussoir-shaped segments 24, each comprising a plurality of nested, voussoir-shaped layers 26 of film-coated strands spirally laid up about a center layer or layers 28 of spiraled film-coated strands. That portion of the strands composing the extrados portion of each strand layer lies close to the corresponding portion of the strands of the adjacent layer. Spacers 30 of paper, nylon, or plastic, for example, or spacers having a permeability greater than air, as disclosed in Lapsley copending application Serial No. 108,875, are provided along the intrados face of center layer 28 and along the intrados face of the immediately overlying layer 26. The number of layers, the number of spacers, and the number of strands composing each layer may be varied as desired, as disclosed in copending application Serial No. 89,774.

Figure 5:
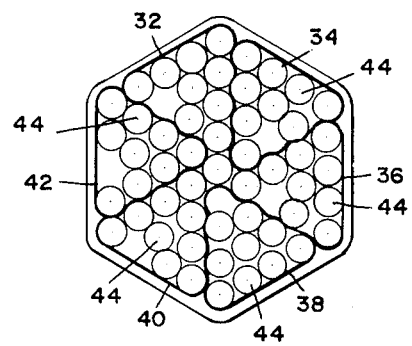

In FIG. 5 there is illustrated a conductor of the type disclosed in copending application Serial No. 23,681, which may be used to good advantage in connection with the instant invention. The conductor of this illustration, as fully explained in copending application Serial No. 23,681, is a segmental, stranded conductor wherein each individual strand of each segment occupies, for an equal proportion of segment length, each of the strand positions within the segment, and, the several segments of the conductor being cabled together, each segment twines around the conductor axis and occupies all positions around said axis for equal proportions of the conductor length. The several segments of this conductor have been designated 32, 34, 36, 38, 40, and 42, respectively. The film-coated strands composing this conductor have been designated 44.

Figure 6:
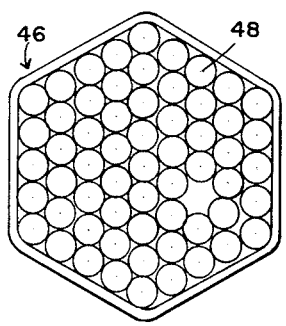

The conductor 46 illustrated in FIG. 6 is of a type disclosed in copending application Serial No. 23,681 and is a stranded, uni-directional-lay conductor composed of individually insulated strands 48. As explained in said copending application, each film-coated strand is moved from one strand position to all others while being unidirectionally wound around the conductor axis. All strands have the same length of lay, and, being unidirectionally wound, the strands of overlying layers nest in available hollows or interstices of underlying layers so as to obtain a conductor with high volume efficiency and high reactance and/or IX drop, and consequently low $I^2R$ loss.

Figure 7:
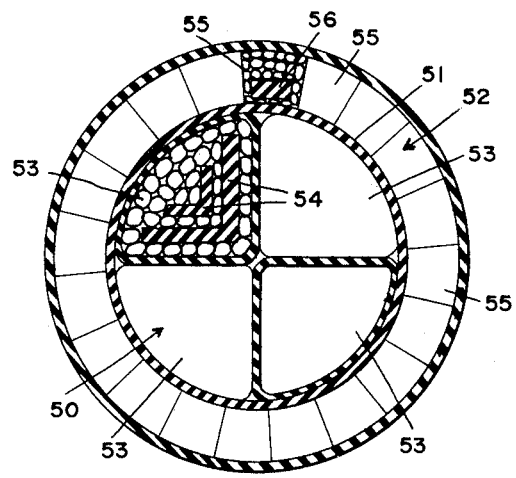

The conductor illustrated in FIG. 7 is of a type disclosed in copending application Serial No. 90,398 and, as pointed out in that application, is a composite conductor composed of inner dynamically balanced conductor 50 and outer dynamically balanced conductor 52, electrically separated along their length by insulating layer 51. The inner conductor is composed of segments 53, cabled together. Each segment is composed of a multiplicity of nested, segment-shaped layers of film-coated strands. A spacer 54 is provided along and radiates from the apex of each underlying layer, and overlying layers are spiraled over the spacer and underlying layer. This provides a construction, as pointed out in said copending application Serial No. 90,398, in which each segment is composed of film-coated strands lying side by side, laid up in nested layers, with those portions of the strand length forming the arcuate perimeter of a layer of strands lying close to the corresponding portions of the overlying layer, and with those portions of the strand length forming the apex and flat faces spaced from corresponding portions of the overlying layer. The outer dynamically balanced conductor 52 is composed of a multiplicity of spirally laid voussoir-shaped segments 55, each composed of nested layers of film-coated strands. Spacers 56 are placed along the intrados face of the underlying layer, and the overlying layer of strands is cabled about the spacer and the underlying layer of strands. This provides segments each composed of film-coated strands lying side by side, laid up in nested layers, with those portions of the strand length forming the extrados portions of a strand layer lying close to the corresponding portions of the overlying layer, and with those portions of the strand length forming the intrados portions of a layer of strands spaced from corresponding portions of the overlying layer. When using the composite conductor of FIG. 7, the inner conductor 50 and outer conductor 52 must be transposed connected in successive conductor lengths as explained in application Serial No. 90,398.

Figure 8:
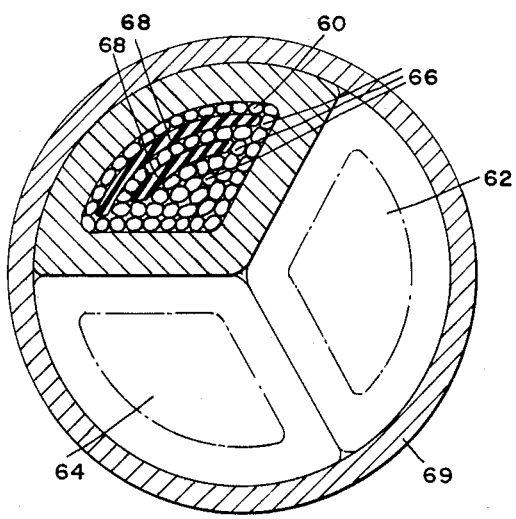
FIG. 8 shows a plurality of dynamically balanced conductors of a different style which may be used in the cable system of FIG. 1.

FIG. 8 illustrates a multi-conductor assembly of the oriented style of spacer type dynamically balanced conductors which is of advantage in connection with the instant invention. This multi-conductor assembly is of the construction disclosed in copending application Serial No. 27,443 above referred to, and is composed of three sector shaped phase conductors 60, 62, and 64, each for use as the conductor of a separate phase of a three-phase circuit. As will be apparent from the drawing, the strands 66 are spirally laid up in layers and crushed and/or formed into sectors, with spacers 68 intermediate the layers on the arcuate portion of each layer of the sector. Each strand of the conductor has film insulation on its surface. Each sector is insulated, and the sectors are cabled into and maintained in oriented spaced relation by binder 69.

It will be appreciated that by proper design and use of the spacer-type dynamically balanced conductors or by use of the transposed-strand-type of dynamically balanced conductors the effects of the higher internal and external reactance to which the conductors are subjected when used in conjunction with the metallic enclosure 8 containing magnetic field trap 12 can be compensated for, and the IR drops of the strand currents flowing in the various strands of a conductor will be uniform or approach uniformity, the phase angles of the strand currents in a conductor will be uniform or approach uniformity, and the algebraic sum of the strand currents of a conductor will be reduced to approach the effective conductor current. The induced currents circulating among strands within each conductor can be eliminated or held to negligibly small values with such conductors.

The spacers of the dynamically balanced conductors will, of course, have to be of slightly larger cross-section or higher magnetic property to bring dynamic balance to the conductors when encased in a metallic enclosure 8 containing field trap 12 than when encased in a non-metallic enclosure, or a conventional metallic enclosure.

The test methods for determining the proper design of dynamically balanced conductors under various operating conditions are set out at length in the referenced disclosures. The test wherein a strand from each layer of the conductor or segment of the conductor is separated for a short length from the strand group and the magnitude of the various strand currents and phase angles of the strand currents detected by a coupling to the strand and simultaneously displayed on an oscilloscope are of particular value in arriving at the proper design of conductor for each size and spacing of conductors in each design of the magnetic field trap 12 in enclosure 8 of the invention.

Although the invention has been discussed on the basis of using ferro-magnetic materials in the magnetic field trap 12, it will be appreciated that paramagnetic materials can also be used, as well as combinations of paramagnetic and ferro-magnetic materials.

The essential requirement of the magnetic field trap is to provide within the metallic enclosure a lining of magnetic powder fabricated to have mechanical strength sufficient to prevent undue scuffing during installation of the cables and with magnetic properties sufficient to entrap the magnetic field and prevent or reduce circulating current and/or hysteresis occurring in the pipe wall. The trap also provides a low magnetic reluctance path for closing the secondary magnetic field around any small current which does get induced and flow in the pipe wall.

Although the invention has been discussed in connection with pressure-type cables, it will be appreciated that, where the voltage of the circuit is low enough to permit rubber or other types of dielectric which operate satisfactorily without pressure, the cable system may be comprised only of insulated conductors encased in the magnetic field trap lined enclosure 8 without filling with other material than air at atmospheric pressure.

It will be appreciated that a cable system is provided in which the extra energy losses occurring in the metallic enclosure and occurring within the conductors over and above the losses which would occur with a similar system but utilizing a non-metallic enclosure have been substantially eliminated.

It is understood that changes and modifications within the purview of this invention may be made.

Although only one sector or segment of a type is illustrated in detail in each of FIGURES 3, 4, 7 and 8, it is to be understood that the other sectors or segments of the same type indicated in outline are identical in construction to the one shown in detail.

What is claimed is:

1. An alternating-current electric power cable system, comprising a plurality of insulated conductors disposed within a ferrous magnetic pipe, each of said conductors carrying current of different polarities, and a magnetic field trap lining composed of a dielectric resin having dispersed annealed iron particles therein, said lining located within the pipe intermediate the conductors and the pipe.

2. An alternating-current, electric power cable system comprising, in combination, a plurality of insulated conductors disposed within a ferrous magnetic pipe, said pipe being lined with a magnetic material dispersed in a resin matrix for compressing the magnetic field generated by current flowing in the conductors of different polarities when the system is in operation, thereby substantially to decrease the intensity of the magnetic field entering the pipe.

3. An alternating-current electric power cable system, comprising a plurality of insulated conductors disposed within a metal pipe and carrying current of different polarities, and a magnetic field trap lining the interior surface of the pipe, said lining consisting of a ferrous magnetic powder dispersed in a dielectric resin matrix.

4. A ferrous pipe and a lining adhered to the interior surface of said pipe, said pipe surrounding a plurality of electrical conductors each of which carries a current of different polarity with respect to the other conductors, said lining comprising a mixture of magnetically soft ferrous powder and a matrix material.

5. A ferrous pipe and a lining adhered to the interior surface of said pipe, said pipe surrounding a plurality of electrical conductors each of which carries a current of different polarity with respect to the other conductors, said lining comprising a mixture of ferrous powder and a matix material; the ferrous material comprising said pipe being relatively magnetically hard and the ferrous powder being relatively magnetically soft.

References Cited in the file of this patent

UNITED STATES PATENTS

| | | |
|---|---|---|
| 2,718,542 | Lapsley | Sept. 20, 1955 |
| 2,787,651 | Lapsley | Apr. 2, 1957 |
| 2,849,683 | Miller | Aug. 26, 1958 |
| 2,912,642 | Dahle | Nov. 10, 1959 |
| 3,013,204 | Ford et al. | Dec. 12, 7961 |

UNITED STATES PATENT OFFICE
CERTIFICATE OF CORRECTION

Patent No. 3,160,702                          December 8, 1964

Rhea P. Lapsley

It is hereby certified that error appears in the above numbered patent requiring correction and that the said Letters Patent should read as corrected below.

column 2, line 51, for "applicable" read -- appreciable --; column 4, line 71, for "matearial" read -- material --; column 5, lines 50 and 51, strike out "ergy loss occurring within the cable system. This is done tors" and insert instead -- strands of the same conductor are increased. These factors --; line 58, for "scale" read -- cable --; column 10, line 5, for "matix" read -- matrix --; line 15, for "Dec. 12, 7961" read -- Dec. 12, 1961 --.

Signed and sealed this 4th day of May 1965.

(SEAL)
Attest:

ERNEST W. SWIDER
Attesting Officer

EDWARD J. BRENNER
Commissioner of Patents